United States Patent [19]

Takayasu

[11] 3,719,799
[45] March 6, 1973

[54] ELECTRIC IMMERSION HEATER

[76] Inventor: Kiyosumi Takayasu, 2,5-chome, Harita-Dori, Mizuho-ku, Nagoya, Japan

[22] Filed: July 19, 1971

[21] Appl. No.: 163,927

[30] Foreign Application Priority Data

May 22, 1971 Japan ..................46/41746

[52] U.S. Cl. ..............219/523, 174/65 R, 174/84 R, 219/335, 219/541, 219/544, 338/239, 338/273
[51] Int. Cl. .........................H05b 3/04, H02g 15/04
[58] Field of Search .....................219/280–283, 316, 219/318, 335–338, 523, 528, 533, 534, 541, 544, 548, 549, 550; 338/238–251, 271–274, 276, 214, 228, 229, 226, 326; 174/65 R, 84 R, 84 C, 77 R

[56] References Cited

UNITED STATES PATENTS

| | | | |
|---|---|---|---|
| 2,561,932 | 7/1951 | Landgraf | 219/523 |
| 2,643,317 | 6/1953 | Tuttle | 338/242 X |
| 2,766,367 | 10/1956 | Chaustowich | 219/523 |
| 3,225,321 | 12/1965 | Walter | 219/523 X |
| 3,632,977 | 1/1972 | Takayasu | 219/335 |

*Primary Examiner*—A. Bartis
*Attorney*—I. Irving Silverman et al.

[57] ABSTRACT

An electric immersion heater having an improved connection with a multicore electric cord. The cabtyre cord extends through a holding metal tube gastightly welded to the cord inlet opening of a heater casing. A protective metal tube and a heat-shrinkable resin tube are tightly fitted on the heater-side end of the multicore electric cord. At least one annular groove is formed on the holding metal tube so as to depress the heat-shrinkable resin tube and the protective metal tube against the multicore electric cord for gastightly sealing along the annular groove. A second annular groove may be provided on the holding metal tube at the position facing the protective metal tube. If a reduced diameter portion is provided at that location, a second heat-shrinkable resin tube is applied thereto. The entire connection of the cord to the casing may be covered with an outer resin tube.

3 Claims, 4 Drawing Figures

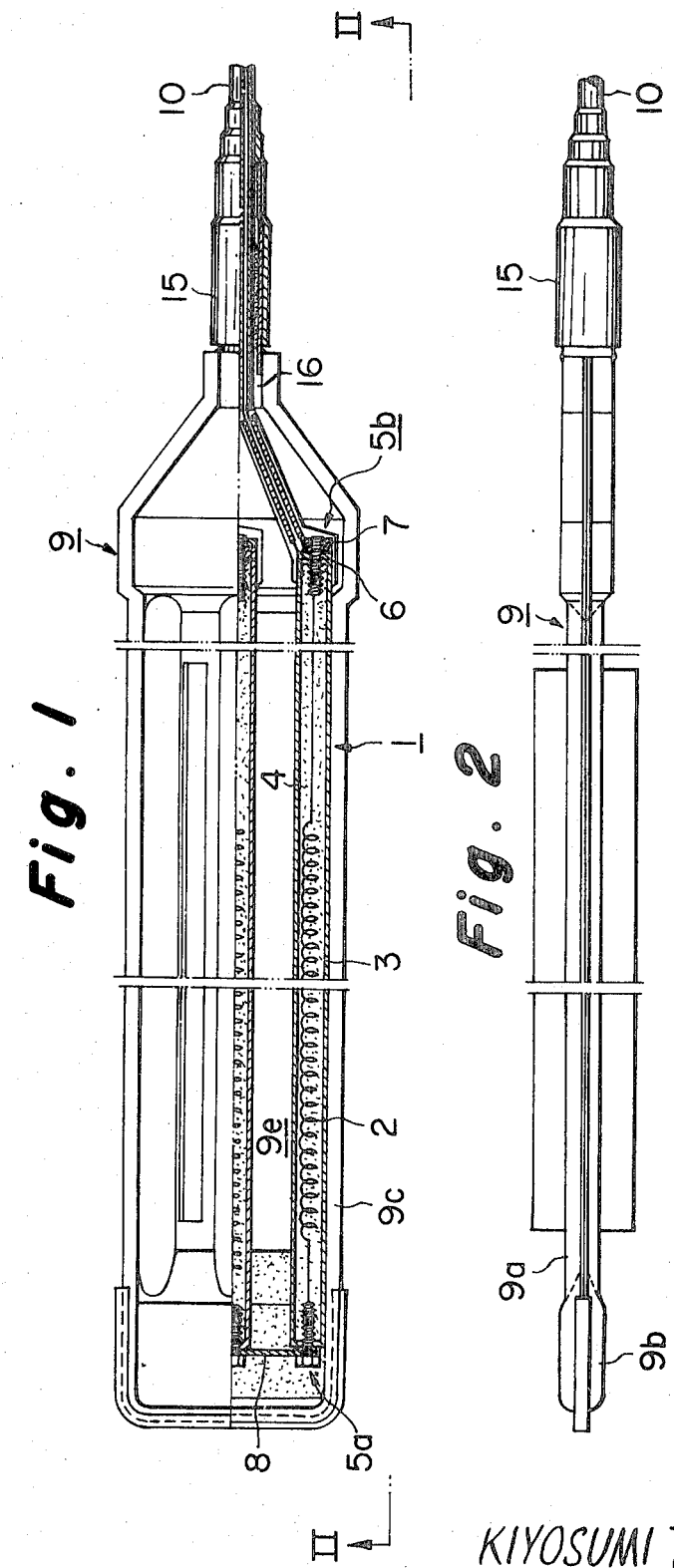

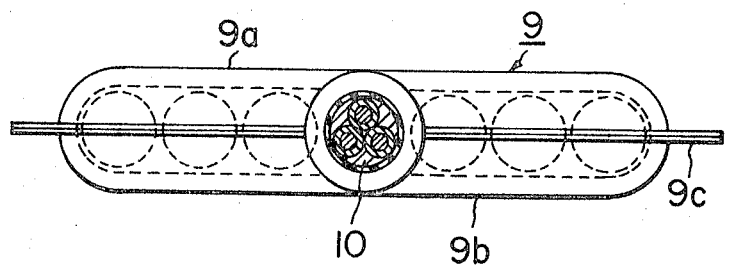

3,719,799

ELECTRIC IMMERSION HEATER

BACKGROUND OF THE INVENTION

This invention relates to an electric immersion heater, and more particularly to the gastight connection of an electric cord, such as a cabtyre cord, to the casing of an immersion heater for heating corrosive liquid.

In order to efficiently heat liquid, various types of immersion heaters have heretofore been used; for instance, the present inventor has disclosed an immersion heater of simple construction, in copending U.S. Pat. application Ser. No. 101,970, filed on Dec. 28, 1970, now U.S. Pat. No. 3,632,977, granted Jan. 4, 1972. With known immersion heaters, especially those designed for heating corrosive liquid, the construction of their connection to electric cords for power supply is rather complicated for the purposes of preventing the liquid being heated from seeping into the heater. In the case of the aforesaid U.S. Pat. application Ser. No. 101,970, the liquid seepage into the heater is prevented by a combination of a sleeve-like packing and a threaded plug. More particularly, the sleeve-like packing or gland is fitted on the outermost sheath of the cabtyre cord at the heater-side end thereof, and the sleeve-like packing or gland is inserted to the central passage of a plug having threaded outer surface, together with the cabtyre cord, so that upon tightening the plug to a similarly tapped cord inlet opening of the heater casing, the cabtyre cord is gastightly connected to the heater casing.

The production of such threaded plug and the tapped cable inlet opening of the known immersion heaters requires considerable skill and consumes long working time. For heating corrosive liquid, precision machining is required to make the cord connection gastight, and the heater becomes costly. In addition to such complication in the manufacturing process, the threaded engagement between the plug and the cord inlet opening of the heater casing is susceptible to loosening by aging. The repeated subjection of the immersion heater to quick temperature change, which is inevitable when the immersion heater is drawn from a heated liquid, tends to accelerate the loosening of the plug fitted in the cord inlet opening of the heater casing. Unless such risk of plug loosening is completely removed, it is rather difficult to eliminate the danger of liquid seepage into the immersion heater.

Therefore, an object of the present invention is to obviate the aforesaid difficulties of conventional immersion heaters, by providing an immersion heater having an improved and simplified connection to an electric cord. An electric immersion heater is provided having at least one heating element. A casing consisting of equal two halves made of corrosion-resistive metal and encloses the heating element. A cord inlet opening is bored through the casing and a cabtyre or multicore electrical cord having core conductors connected to the heating element and enters into the heater casing through the cord inlet opening. A protective metal tube made of corrosion-resistive metal is tightly fitted on the outermost sheath of the said cabtyre cord at the heater-side end thereof. The protective metal tube is spaced from the heater-side edge of the outermost sheath and the length of the protective metal tube in the longitudinal direction of the cord is not smaller than the outermost sheath diameter. A heat-shrinkable resin tube tightly covers the entire length of the protective metal tube and has two extended portions extending in opposite directions away from the protective metal tube. The extended portions are directly bonded to the outermost sheath in the proximity of the opposite edges of the protective metal tube in a gastight fashion. There is provided a holding metal tube having an inner diameter substantially identical with the outer diameter of the heat-shrinkable resin tube on the protective metal tube. The holding metal tube fits on the heat-shrinkable resin tube over the entire length of the heat-shrinkable resin tube the heater-side end of the holding metal tube is gastightly welded to the cord inlet opening of the casing. At least one annular recess is formed on the periphery of the holding metal tube, the annular recess falling on a plane perpendicular to the longitudinal axis of the protective metal tube and the location and the depth of the annular recess being such that the annular recess presses the heat-shrinkable resin tube and the protective metal tube against the outermost sheath with a sufficiently high pressure to gastightly seal the casing at the annular recess.

BRIEF DESCRIPTION OF THE DRAWING

For a better understanding of the invention, reference is made to the accompanying drawings, in which:

FIG. 1 is a partially cut-away plan view of an immersion heater, according to the present invention;

FIG. 2 is an elevation of the immersion heater;

FIG. 4 is an end view of the immersion heater of FIG. 3.

DESCRIPTION OF THE PREFERRED EMBODIMENT

Figure 3:
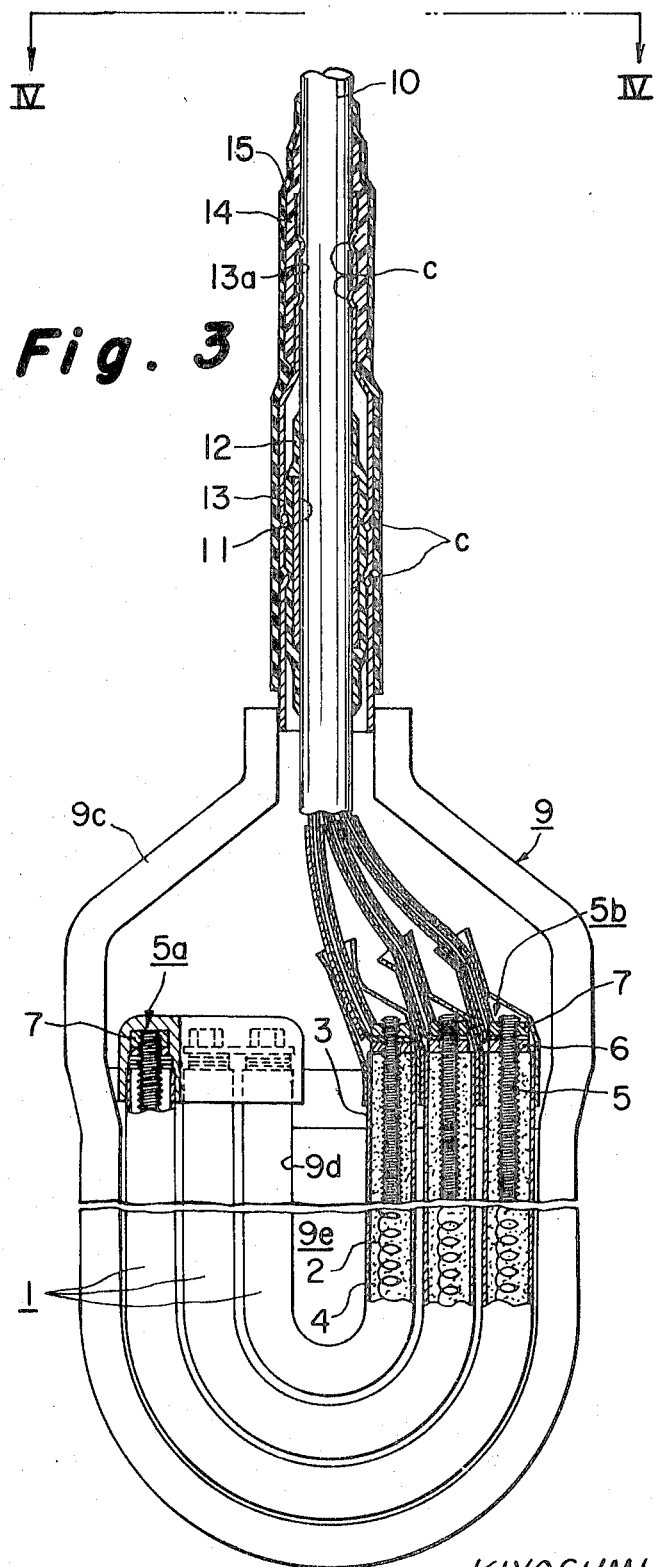
FIG. 3 is a partially cut-away plan view of another immersion heater, according to the present invention, with one half of its casing removed.

Referring to FIGS. 1 to 4, a heating element 1 is formed by disposing a heating wire 2, e.g., a Nichrome wire, in a metallic tube 3 made of heat-conductive corrosion-resistive metal and isolating the heating wire 2 from the tube 3 by filling insulating powder 4 therebetween. The insulating powder 4 is, of course, heat-conductive. Electric terminals $5a$ and $5b$ are mounted on each heating element 1 at its opposite ends. The heating element 1 may be rectilinear, as shown in FIGS. 1 and 2, or it can be U-shaped, as shown in FIGS. 3 and 4.

The opposite ends of each heating wire 2 are electrically connected to the terminals $5a$ and $5b$, for instance, by welding. The terminals $5a$ and $5b$ are bonded to the metallic tube 3 by a suitable known means, e.g., by applying adhesive, while insulating the former from the latter by inserting mica pieces 6 therebetween, as shown in FIGS. 1 and 4. The mica pieces 6 act to seal the insulating powder 4 in the metallic tube 3.

The number of the heating elements 1 for making one immersion heater, according to the present invention, depends on the type of the power source available and the heating capacity required for the immersion heater. In each of the embodiments, as illustrated in FIGS. 1 to 4, three heating elements 1 are used to produce an immersion heater for an electric power source of three-phase three-wire system.

One of the terminals, e.g., the terminal 5b, of each heating element 1 is connected to the corresponding core conductor of a cabtyre cord 10, by means of a fastening nut 7. The exposed portion of the core conductor of the cabtyre cord 10 is covered by a plurality of short insulator tubes, so as to completely insulate the three core conductors from each other. To stabilize the short insulator tubes, a silicone insulating tube may tightly be fitted on the short insulator tubes on each core conductor of the cabtyre cord 10.

The opposite terminal, e.g., the terminal 5a, of each of the three heating elements 1 in the immersion heater is connected to a common conductor 8 by means of a nut 7. The common conductor 8 thus connected to the three heating elements 1 is coated with a suitable insulating material, and further covered by a suitable foam-free insulating material, e.g., polyester premix. The polyester premix can be shaped into a form suitable for housing in a casing 9.

The casing 9 is of the so-called form-fit type, which closely fits the shape of the three heating elements 1 to be housed therein. The casing 9 consists of a pair of substantially identical halves 9a and 9b made of thin corrosion-resistive metal sheet, which halves are joined together by gastightly seam-welding the periphery 9c thereof after housing the heating elements 1 therein. Land portions of the halves 9a and 9b between the portions fitting the heating elements may also be welded. The peripheral edges 9c of the casing 9 thus formed by seam-welding the two halves 9a and 9b may be used as a heat-emanating fin. The casing 9 includes a cord inlet opening 16 for receiving the cabtyre cord 10 in the immersion heater.

The construction of the gastight connection of the cabtyre cord 10 to the cord inlet opening 16 will now be described in detail by referring to FIGS. 3 and 4. The connection of the cabtyre cord 10 in the embodiment of FIGS. 1 and 2 can be effected in the same manner as that of the embodiment of FIGS. 3 and 4.

Referring to FIG. 3, a protective metal tube 11 made of corrosion-resistive metal is tightly fitted on the outermost sheath of the cabtyre cord 10 toward the heater-side end thereof. In the figure, the lower edge of the protective metal tube 11 is spaced from the lowermost edge of the cabtyre sheath. The length of the protective metal tube 11, taken in the longitudinal direction of the cabtyre cord 10, must be greater than the diameter of the cabtyre cord 10. Any corrosion-resistive metal can be used for making the protective metal tube 11, but it is preferably made of such metal as titanium, tantalum, niobium, zirconium, stainless steel, and nickel. The thickness of the metal wall of the protective metal tube 11 should preferably fall in a range of 0.3 to 0.5 mm, so as to provide proper mechanical strength to the metal tube 11.

The protective metal tube 11 is covered by a first heat-shrinkable resin tube 12. The material for the first resin tube 12 should have a high corrosion-resistivity and should preferably have a high bondability with the outermost sheath of the cabtyre cord 10. Preferred material for the first resin tube 12 is polyethylene or vinyl chloride.

A holding metallic tube 13 having an inner diameter substantially identical with the outer diameter of the first resin tube 12 is fitted on the first resin tube 12. The holding metallic tube 13 is made of the same metallic material as the protective metallic tube 11, and the lower end of the holding metallic tube 13 is gastightly welded to the periphery of the cord inlet opening 16 of the casing 9.

Although it is not essential, the upper end 13a of the holding metal tube 13 is preferably contracted by reducing its diameter so as to bring it into direct contact with the peripheral surface of the outermost sheath of the cabtyre cord 10, as shown in the embodiment of FIG. 4. When such reduced-diameter portion 13a is formed, it is preferable to cover the contracted or reduced-diameter portion 13a with a second heat-shrinkable resin tube 14, which is made of resin similar to that for the first resin tube 12.

Furthermore, it is preferable to cover the area from the core inlet opening 16 to the farthest end of the second resin tube 14, relative to the casing 9, with an outer cover tube 15 made of heat-shrinkable resin, as shown in FIG. 4. Such outer cover tube 15 is, however, not essential to the present invention, and it can be dispensed with.

The process for making the cord connection to the immersion heater, as shown in FIGS. 3 and 4, will now be described.

1. The core conductors of the cabtyre cord 10 are connected to the corresponding heating elements 1 of the immersion heater, and the bared or exposed portions of the core conductors are protected by applying the short insulator tubes and insulating resin tubes thereon.

2. The protective metal tube 11 is tightly fitted to the heater-side end of the cabtyre cord 10 on the peripheral surface of the outermost sheath of the cord 10, and the first heat-shrinkable resin tube 12 is tightly fitted on the protective metal tube 11, while extending the opposite ends of the resin tube 12 beyond the protective metal tube 11 for causing the extended portions of the resin tube 12 to directly contact the outermost sheath of the cabtyre cord 10. Then, the extended portions of the first resin tube 12 at the opposite ends of the metal tube 11 are welded to the outermost sheath of the cabtyre cord 10. If the first resin tube 12 is made of polyethylene, it may be bonded to the outermost sheath of the cabtyre cord 10 by using a suitable adhesive.

The step of the aforesaid paragraph (2) may be effected prior to the step of the paragraph (1), if it is more convenient to do so.

3. The lower end or the heater-side end of the holding metallic tube 13 is gastightly welded to the cable inlet opening 16 of the casing 9 of the immersion heater.

4. The cabtyre cord 10 is drawn through the holding metal tube 13 to the outside of the casing 9, and the fin-like peripheral portions 9c of the two halves 9a and 9b are seam-welded, in a gastight fashion, so as to complete the casing 9. The farthest end of the holding metal tube 13, relative to the casing 9, is contracted, so as to make the reduced-diameter portion 13a.

5. As least one annular groove c is formed around that portion of the holding metal tube 13 which is in tight contact with the first heat-shrinkable resin tube 12, by a suitable machining process, such as by rolling. The position and the depth of such annular groove c are such that both the first resin tube 12 and the protective metal tube 11 are urged or squeezed against the outermost sheath of the cabtyre cord 10 with a pressure high enough for gastightly sealing the inside of the casing 9 from the outside atmosphere at the annular groove c by such squeezing action of the annular groove c. In the embodiment of FIG. 4, two annular grooves c are formed on the holding metal tube 13 at the position facing the protective metal tube 11. Furthermore, although it is not essential, one or more annular grooves c of the same nature are preferably formed on the small-diameter portion 13a of the holding metal tube 13, as shown in FIG. 4.

6. A second heat-shrinkable resin tube 14 is applied on the reduced-diameter portion 13a of the holding metal tube 13 as shown in FIG. 4. If no reduced-diameter portion 13a is used, such second heat-shrinkable resin tube 14 is not necessary. The farthest end of the second resin tube 14, as seen from the casing 9, is brought into direct contact with the outermost sheath of the cabtyre cord 10, and the former is preferably welded to the latter.

7. The entire connection of the cabtyre cord 10 to the casing 9 of the immersion heater should preferably be covered with an outer resin tube 15, for ensuring the sealing effects of the annular grooves c and the second resin tube 14. The outer resin tube 15 should cover the entire length of the holding metal tube 13 and the second resin tube 14, as shown in FIG. 4. The material of the outer resin tube 15 is preferably the same as that for the first and second heat-shrinkable resin tubes 12 and 14.

8. The immersion heater thus assembled, especially its connection with the cabtyre cord 10, is subjected to live immersion tests by applying the rated voltage to the immersion heater while keeping the immersion heater in water together with the cabtyre cord 10. If proved to be satisfactory, the immersion heater is complete and ready for shipment. On the other hand, if any defect is found during the live immersion test, such defect is corrected until the immersion heater proves to be satisfactory.

As described in the foregoing disclosure, according to the present invention, a cabtyre cord 10 is gastightly connected to an immersion heater casing 9 without using any threads or packings, so that the leakage of the liquid being heated to the inside of the immersion heater can effectly be prevented. Thus, efficient liquid heating can be ensured by means of the immersion heater with the improved connection to the cabtyre cord.

The salient features of the immersion heater according to the present invention are as follows.

a. The connection of the cabtyre cord to the immersion heater casing can be completed by using comparatively inexpensive material, so that the overall cost of the immersion heater can be minimized.

b. No threaded members are used, and hence, the need for machining process to make the threads and tapping can completely be eliminated.

c. The elimination of threaded elements makes the immersion heater free from the risk of loosening, and the necessity of comparatively expensive gland packings, such as packings made of Teflon (Trade Mark of E.I. du Pont de Nemours & Co. Inc.), is completely removed.

d. The sealing in the cabtyre cord connection according to the present invention is more effective than conventional sealing accomplished by tightening with gland packings.

e. A second annular groove may be provided on the holding metal tube at the position facing the protective metal tube. If a reduced diameter portion is provided at the location, a second heat-shrinkable resin tube is applied thereto. The entire connection of the cord to the casing may be covered with an outer resin tube. The term "cabtyre" cord is defined as a multicore electrical cord in U.S. Letters Pat. No. 3,632,977.

I claim:

1. An electric immersion heater, comprising at least one electric heating element; a casing consisting of two equal halves made of corrosion-resistive metal and completely enclosing the heating element; a cord inlet opening bored through the casing; a multicore electric cord having an outermost sheath and core conductors connected to the heating element terminals and entering the heater casing through the cord inlet opening; a protective metal tube made of corrosion-resistive metal and tightly fitted on the said outermost sheath of the multicore electric cord at the heater-side end thereof, the protective metal tube being spaced from the heater-side edge of the said outermost sheath, the length of the protective metal tube in the longitudinal direction of the cord being not smaller than the said outermost sheath diameter; a heat-shrinkable resin tube tightly covering the entire length of the protective metal tube and having two extended portions extending in opposite directions away from the protective metal tube, said extended portions being gastightly bonded to the said outermost sheath in the proximity of the opposite edges of the protective metal tube; a holding metal tube having an inner diameter substantially identical with the outer diameter of the heat-shrinkable resin tube, the holding metal tube tightly covering the entire longitudinal length of heat-shrinkable tube, the heater-side end of the holding metal tube being gastightly welded to the cable inlet opening of the casing; and at least one annular groove formed on the periphery of the holding metal tube, the annular groove falling on a plane perpendicular to the longitudinal axis of the protective metal tube, the location and the depth of the annular groove being such that the annular groove presses the heat-shrinkable resin tube and the protective metal tube against the said outermost sheath with a sufficiently high pressure to gastightly seal the casing at the annular groove.

2. An electric immersion heater according to claim 1, wherein the farthest end of the holding metal tube, relative to the casing, is contracted by reducing its diameter so as to bring the holding metal tube in direct contact with the said outermost sheath of the multicore electric cord, and at least one second annular groove is formed on the reduced-diameter portion of the holding metal tube in the same manner as the first annular groove adjacent the heat-shrinkable resin tube and the protective metal tube, the reduced-diameter portion being covered by a second heat-shrinkable resin tube.

3. An electric immersion heater according to claim 2 and further comprising an outer resin tube covering the entire length of the holding metal tube and the second heat-shrinkable resin tube.

* * * * *